United States Patent Office 2,715,116
Patented Aug. 9, 1955

2,715,116

EMULSION POLYMERISATION OF STYRENE COMPOUNDS

Henry Malcolm Hutchinson, Banstead, England, assignor to The Distillers Company Limited, Edinburgh, Scotland, a British company No Drawing. Application August 25, 1952, Serial No. 306,300

Claims priority, application Great Britain November 20, 1948

9 Claims. (Cl. 260—91.5)

The present invention relates to the polymerisation of styrene compounds in aqueous emulsion and, specifically, to a novel class of emulsifying agents for use in such processes and is a continuation-in-part of my application Serial No. 123,975 which was filed on October 27, 1949 (now abandoned).

The polymerisation in aqueous emulsion of styrene and alpha-methylstyrene and their chlor, methyl-and/or ethyl-nuclear substituted derivatives, herein termed "styrene compounds," is well known, and is generally effected at a pH of 3–11, preferably 5–9, and preferably in the presence of a polymerisation catalyst. In order to save the considerable expenditure of energy which would otherwise be spent in maintaining the styrene compound in suspension as an emulsion, an emulsifying agent is almost invariably added, but the great majority of these agents, while effectively stabilising the emulsion, have a detrimental effect on the polymer formed and are extremely difficult to remove therefrom, even if resort is had to repeated washing with boiling water. For example, when soaps such as sodium stearate are used, the final polymer is cloudy or opaque when moulded and the soap can only be removed by prolonged extraction of the polymer by alcohol or a similar expensive solvent. Furthermore, a number of emulsifying agents which are compatible with the polymer and therefore need not be removed from the product have the disadvantage of retarding the polymerisation process or giving discoloured polymers.

It has now been discovered that the alkali metal, amine and ammonium salts of mono-esters of certain dicarboxylic acids with saturated aliphatic alcohols of 5–32 carbon atoms are effective emulsifying agents which do not substantially retard the polymerisation of styrene compounds in aqueous emulsion and can readily be removed from the products by hydrolysis and steam distillation, the dicarboxylic acid or its alkali salt remaining in the aqueous phase. Alternatively, the mono-esters may be left in the polymer in the form of the compatible hydrogen alkyl ester.

The dicarboxylic acids which can be used to form the mono-esters of the present invention are the non-hydroxylated saturated aliphatic alpha-omega dicarboxylic acids of 2–12 carbon atoms, the various non-hydroxylated benzene and naphthalene dicarboxylic acids, citraconic, itaconic and mesaconic acids and delta$^4$-tetrahydrophthalic acid and its analogues capable of being made according to the Diels-Alder reaction. It is preferred to employ half esters of dicarboxylic acids devoid of ethylenic unsaturation as the emulsifying agent, since then the possibility of some copolymerisation taking place is completely eliminated and a pure polymer is ensured, the half esters of acids such as maleic acid also tending to retard the polymerisation to some degree.

The delta$^4$-tetrahydrophthalic acid and its analogues which may be used to form the new ester emulsifying agents of the present invention are those di-basic acids which may be obtained by reacting alpha-beta unsaturated alpha-beta-di-carboxylic acids or anhydrides with a compound containing the conjugated group—

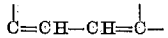

according to the Diels-Alder reaction. When an anhydride is reacted with the compound containing the conjugated group, the resultant product may retain the dicarboxylic anhydride group which may be hydrolysed to give the di-basic acid, or which may be reacted directly with one molecule of alcohol to give the half ester of the dicarboxylic acid. For instance, delta$^4$-tetrahydrophthalic acid may be obtained from the reaction product of butadiene and maleic acid or anhydride while its analogues such as 3,6-endomethylene delta$^4$-tetrahydrophthalic acid and 3,6-endoethylene 3-methyl-6-isopropyl delta$^4$-tetrahydrophthalic acid may be obtained by reacting maleic acid or anhydride with cyclopentadiene or alpha-terpinene. Similarly, its analogues such as 1-methyl-delta$^4$-tetrahydrophthalic acid may be obtained by reacting citraconic acid or anhydride with butadiene.

The amount of ester-salt present should be in the range 0.25–10%, preferably 0.5–5% by weight, on the aqueous phase, and the pH should not be less than about 3, as in the lower pH range substantial conversion to the free acid ester takes place with consequent loss of emulsifying power. The emulsion polymerisation may be carried out in the presence of any suitable polymerisation catalyst which is known to be effective for the emulsion polymerisation of styrene compounds.

The following examples illustrate specific embodiments of the process of this invention:

Example 1

1 volume of 99.8% pure styrene was emulsified with 1½ volumes of an aqueous solution containing 0.15% by weight of ammonium persulphate and 2% by weight of sodium n-octyl phthalate, and heated for 6 hours at 80° C. without stirring. At the end of this time, polymerisation was substantially complete and the emulsion was made alkaline with sodium hydroxide and boiled to hydrolyse the ester and steam distil the liberated normal octanol.

The emulsion was then coagulated by adding hydrochloric acid and the polymer was separated by filtration and washed with demineralised water until the filtrate was neutral. After drying, the polymer was in the form of a fine powder which gave a water-clear mass on pressing at 150° C.

Example 2

Styrene was polymerised in emulsion as described in Example 1 and then coagulated with hydrochloric acid and washed with water until neutral, the hydrolysis and steam distillation step being omitted. A substantial proportion of the free acid phthalate was left in the polymer which, after drying, could be pressed at temperatures in the range 120–200° C. to give a water-clear mass.

In Examples 1 and 2, sodium normal octyl phthalate was used, but sodium 2-ethyl hexyl phthalate can be substituted without any change in procedure. However, replacement by sodium stearate resulted in cloudy mouldings.

Example 3

1 volume of styrene containing 0.1% by weight of isopropylbenzene hydroperoxide and 1.5 volumes of water containing 0.5% by weight of sodium lauryl phthalate were emulsified, and the emulsion was heated under vacuum for 10 hours at 80° C., when the percentage polymerisation was greater than 99.5%. The polymer was precipitated by adding dilute hydrochloric acid, washed with six volumes of water, dried, and pressed at 150° C. to give a completely clear sheet.

A second portion of polystyrene latex, prepared in the same manner, was evaporated to remove water and then pressed, all the emulsifying agent originally added remaining with the polymer. In this case, also, completely clear pressings were obtained.

Substitution of sodium myristyl phthalate or the addition of 0.25% by weight of lauryl alcohol to the aqueous phase, in the process of Example 3 gave similar results. The use of 1% by weight, on the aqueous phase, of ammonium lauryl phthalate also gave similar results, the polymerisation in this case being carried out for 12 hours at 90°C.

*Example 4*

1 volume of styrene was emulsified with 1.5 volumes of water containing 2% by weight of the morpholine salt of stearyl hydrogen phthalate and 0.13% by weight of ammonium persulphate. After heating for 20 hours at 80° C., an 82% yield of polymer was obtained, and the emulsion was steam distilled to remove monomeric styrene, coagulated with dilute hydrochloric acid, washed with six volumes of water and dried. The resulting polymer gave clear mouldings.

In this example, substitution of the triethanolamine salt of the acid ester and polymerisation for 20 hours at 80° C. gave a 95% yield of polymer, while substitution of an equal weight of potassium stearyl phthalate resulted in a 99.5% yield after 10 hours at 80° C. In each case, coagulation with sulphur dioxide after steam distillation, followed by washing with water, gave a polymer which could be pressed to clear mouldings.

*Example 5*

1 part of styrene containing 0.3% by weight of isopropylbenzene hydroperoxide was emulsified with 1.5 parts of water containing 0.25% by weight each of the sodium salts of cetyl and stearyl hydrogen phthalates. After heating at 80° C., slowly rising to 90° C. over a period of 10 hours, the whole emulsion was spray dried, and the product gave clear mouldings.

*Example 6*

1 volume of styrene was emulsified with 1.5 volumes of water containing 1% by weight of ammonium lauryl 1:8 naphthalate and 0.2% by weight of ammonium persulphate, and the emulsion was heated for 15 hours at 80° C. to give a polymer latex. This latex, when evaporated to dryness, gave a product which could be pressed to clear mouldings.

*Example 7*

Styrene was polymerised as described in Example 6, using sodium lauryl succinate as emulsifying agent and heating the emulsion at 90° C. for 15 hours. The resulting latex was coagulated with dilute hydrochloric acid and washed with six parts of water to give a polymer which, after drying, gave clear pressings.

In this example, substitution of 2% of sodium 2-ethyl hexyl adipate for the sodium lauryl succinate, and polymerisation for 20 hours at 80° C., gave a similar product.

*Example 8*

1 volume of styrene was emulsified with 1.5 volumes of water containing 0.5% by weight of sodium lauryl maleate and 0.065% by weight of isopropylbenzene hydroperoxide, and the emulsion was heated for 7 hours at 80° C. to give a 63% yield of polymer. Residual styrene was removed by steam distillation, and the emulsion was treated as described in the preceding example to give a similar product.

*Example 9*

0.7 part by volume of styrene and 0.3 part by volume of alpha-methylstyrene were emulsified in 2 parts by volume of water containing 0.5% by weight each of the sodium salts of cetyl and stearyl hydrogen phthalates. 0.1% by weight on the combined monomers of isopropylbenzene hydroperoxide was added as catalyst. The mixture was emulsified and heated at 80° C. under a nitrogen atmosphere with slow stirring until copolymerisation was essentially complete. Residual traces of monomers were stripped from the copolymer emulsion by steam distillation and the copolymer was precipitated by adding sulphur dioxide. The copolymer obtained by filtration after washing with hot water and drying, gave transparent mouldings.

In this example, 2% of sodium lauryl phthalate of sodium 2-ethylhexyl phthalate or of sodium n-octyl phthalate may be substituted for the mixed sodium cetyl and stearyl phthalates without essentially affecting the process of the product. The use of 2% sodium stearate, however, resulted in the production of a polymer yielding cloudy mouldings on pressing.

*Example 10*

An emulsion was made by shaking under nitrogen 1 volume of styrene with 1½ volumes of a 1% aqueous solution of the sodium salt of lauryl hydrogen endomethylene tetrahydrophthalate and 0.2% isopropylbenzene hydroperoxide (calculated on the amount of water).

The styrene was polymerised completely by heating the emulsion at 80–100° C. for ten hours under nitrogen to give a free flowing latex. The polymer was isolated by drying down the latex to a fine powder which gave a clear colourless sheet on pressing at a temperature of 130–200° C.

*Example 11*

An emulsion was made by subjecting 1 volume of styrene, 2 volumes of a 0.5% solution of the potassium salt of stearyl hydrogen endomethylene tetrahydrophthalate and 0.5% of isopropylbenzene hydroperoxide (calculated on the amount of water) to high speed stirring under vacuum. After 10 minutes the mixture had formed a stable emulsion and stirring was discontinued.

The styrene was polymerised by heating the emulsion at 90–95° C. for 12 hours under its own vapour in the absence of oxygen with slow stirring. The polymer was isolated by coagulating the latex with formic acid and filtration. After further drying, the polymer was obtained as a powder which gave clear mouldings on pressing at 150–200° C.

While only polymerisation of styrene compounds has been exemplified, the process of this invention can also be used in the emulsion copolymerisation of a major proportion thereof with any copolymerisable monomeric material, such as divinyl benzene, vinyl naphthalene, vinyl esters including vinyl acetate and vinyl crotonate, acrylic and methacrylic acids and their derivatives including acrylonitrile, methyl methacrylate and cyclohexyl acrylate, also ethyl vinyl ketone, and divinyl compounds such as butadiene and isoprene. Amongst the other dicarboxylic acids whose alkyl ester salts are suitable for use according to this invention, in addition to those specifically exemplified, may be mentioned oxalic, malonic, suberic and terephthalic acids, and the half esters may be formed with any alkanol in the range $C_5$–$C_{32}$ including, for example, ceryl and melissyl alcohols.

The polymerisation of styrene in aqueous emulsion in the presence of alkyl hydrogen maleates and their salts has already been proposed, for example, in British Patent No. 588,725, but the process of this invention is distinguished from these prior processes by the much smaller amounts employed, and by the absence of additional emulsifying agents.

I claim:

1. In a process for the aqueous emulsion polymerisation of monomeric polymerisable material comprising a major proportion of a styrene compound selected from the class consisting of styrene, alpha-methylstyrene and the corresponding chlorine, methyl and ethyl nuclear substituted styrenes and alpha-methylstyrenes at a pH not less than 3, the step of effecting the polymerisation in the presence, as emulsifying agent, of a compound selected from the group consisting of the alkali metal, amine and ammonium salts of monoesters of alkanols of 5–32 carbon atoms with a dicarboxylic acid selected from the group consisting of non-hydroxylated benzene dicarboxylic acids, non-hydroxylated naphthalene dicarboxylic acids, maleic, fumaric, citraconic, itaconic and mesaconic acids and saturated non-hydroxylated aliphatic alpha-omega dicarboxylic acids of 2 to 12 carbon atoms and delta$^4$-tetrahydrophthalic acid, 1-methyl-delta$^4$-tetrahydrophthalic acid, 3,6-endomethylene-delta$^4$-tetrahydrophthalic acid and 3,6-endoethylene - 3 - methyl - 6 - isopropyl-delta$^4$-tetrahydrophthalic acid, in an amount of 0.25–10% by weight of the aqueous phase.

2. A process as set forth in claim 1, wherein the said emulsifying agent is an inorganic salt of the mono ester and is present in an amount of 0.5–5% by weight of the aqueous phase at a pH of 5–9.

3. A process as set forth in claim 1, wherein the resulting polymer emulsion is evaporated to dryness without removal of the emulsifying agent.

4. A process as set forth in claim 1, wherein the emulsifying agent in the resulting polymer emulsion is hydrolysed, and the liberated alcohol is removed by steam distillation.

5. A process as set forth in claim 1, wherein the resulting polymer emulsion is coagulated, and the coagulated polymer is water washed.

6. A process as set forth in claim 1, wherein the emulsifying agent employed is devoid of ethylenic unsaturation.

7. A process as set forth in claim 2, wherein the emulsifying agent employed is devoid of ethylenic unsaturation.

8. In a process for the aqueous emulsion polymerisation of monomeric polymerisable material comprising a major proportion of a styrene compound selected from the class consisting of styrene, alpha-methylstyrene and the corresponding chlorine, methyl and ethyl nuclear substituted styrenes and alpha-methylstyrenes at a pH not less than 3, the step of effecting the polymerisation in the presence, as emulsifying agent, of an alkali metal salt of a mono ester of phthalic acid, in an amount of 0.25–10% by weight of the aqueous phase.

9. In a process for the aqueous emulsion polymerisation of monomeric polymerisable material comprising a major proportion of a styrene compound selected from the class consisting of styrene, alpha-methylstyrene and the corresponding chlorine, methyl and ethyl nuclear substituted styrenes and alpha-methylstyrenes at a pH not less than 3, the step of effecting the polymerisation in the presence, as emulsifying agent, of an ammonium salt of a mono ester of phthalic acid, in an amount of 0.25–10% by weight of the aqueous phase.

References Cited in the file of this patent

UNITED STATES PATENTS

| | | |
|---|---|---|
| 2,025,984 | Harris | Dec. 31, 1935 |

FOREIGN PATENTS

| | | |
|---|---|---|
| 772,538 | France | Oct. 31, 1934 |
| 655,523 | Great Britain | July 25, 1951 |